Aug. 12, 1941.        J. W. MURPHY            2,252,601
            APPARATUS FOR CUTTING VEGETATION
              Filed March 28, 1938        2 Sheets-Sheet 1
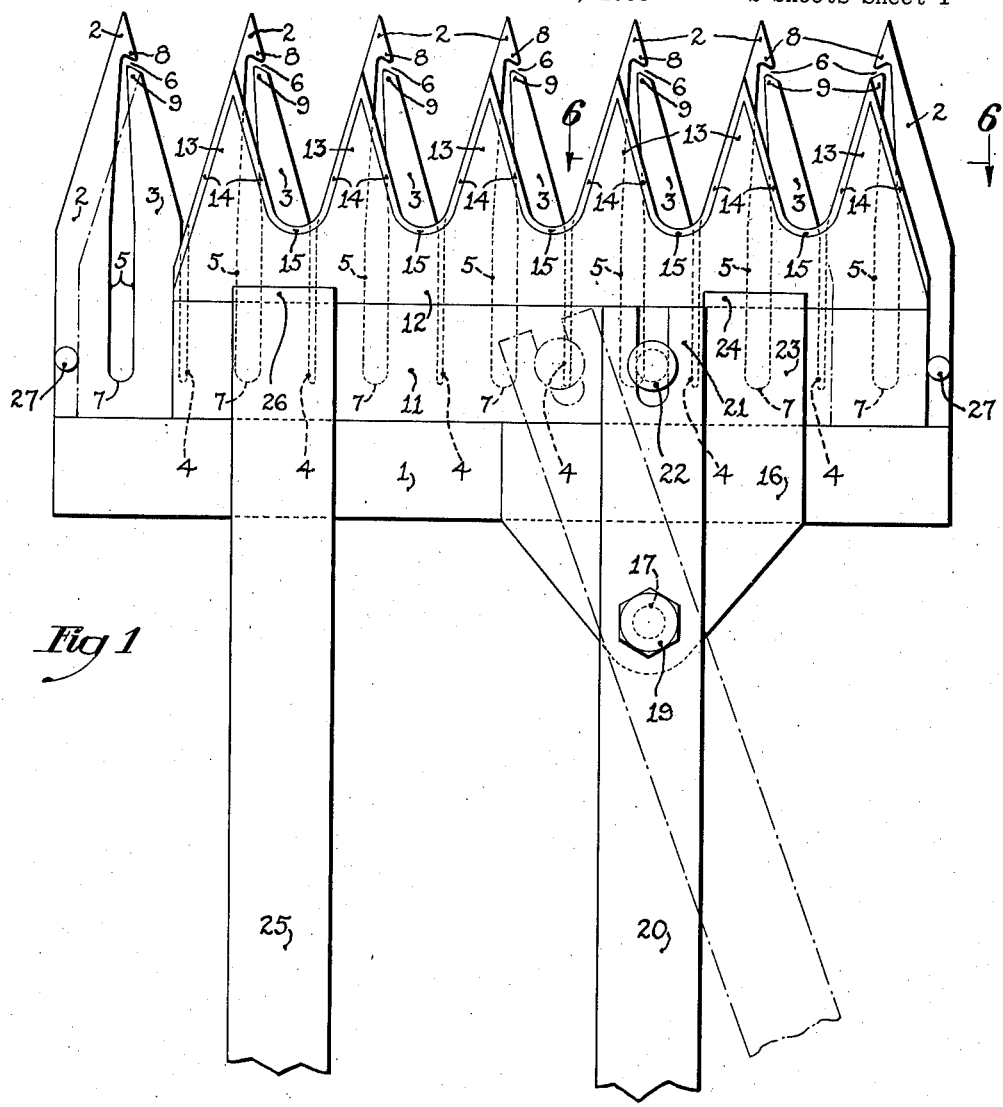
Fig 1
Fig 2
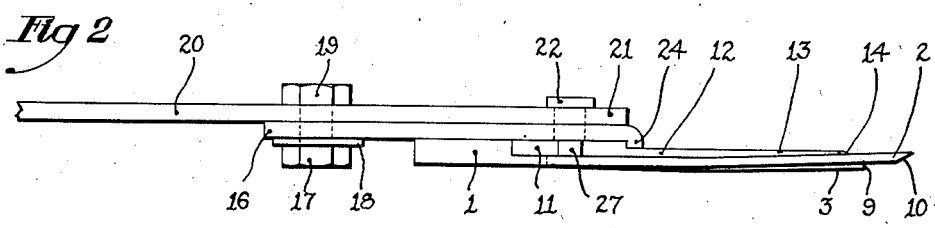
Inventor
John W. Murphy
by Charles E. Ruby
       Atty.

Aug. 12, 1941.    J. W. MURPHY    2,252,601
APPARATUS FOR CUTTING VEGETATION
Filed March 28, 1938    2 Sheets-Sheet 2

Inventor
John W. Murphy
by Charles E. Ruby
Atty.

Patented Aug. 12, 1941

2,252,601

UNITED STATES PATENT OFFICE 2,252,601

APPARATUS FOR CUTTING VEGETATION

John W. Murphy, Concord, Mass.

Application March 28, 1938, Serial No. 198,452

10 Claims. (Cl. 30—211)

The present invention relates broadly to apparatus for cutting vegetation, and, most particularly, to apparatus for cutting vegetation wherein a set of blades, borne by a cutter bar, is reciprocated cooperatively with a second set of blades, borne by a second cutter bar: the present invention is here embodied in an apparatus for trimming grass and hedges, designed to be operated by hand, but it may just as readily be utilized in the constructions of mowing and reaping machines and power-operated grain harvesters.

As is well known to those skilled in the art of apparatus for cutting vegetation, in the use of the presently available kinds of apparatus for cutting grass, wherein a set of blades, borne by a cutter bar, is reciprocated cooperatively with a second set of blades, borne by a second cutter bar, in a plane parallel thereto, the grass, and, most particularly, the fine stalks of young grass having a high moisture content, tend to become drawn between the two sets of blades, thereby effecting a measurable separation of the blades and thus preventing the attainment, by the cutting apparatus, of a shearing cut of the grass so engaged. When a sufficiently large quantity of grass becomes so engaged between the blades of the cutting apparatus, such cutting apparatus becomes hopelessly clogged and can then be operated only inefficiently, if at all. Various constructions have been devised and applied to the blade mechanisms of such cutting apparatus in attempts to eliminate this disadvantageous tendency of such cutting apparatus to become clogged, as, for example, constructions employing various kinds of springs to maintain the sets of blades ever in intimate contact, even at the cost of the development, by reason of the reciprocations of the movable blades, of frictional forces of substantial magnitudes, which are manifested by marked stiffness in the operation of such cutting apparatus and by uneconomical consumption of power.

The principal object of the present invention is to provide apparatus for cutting vegetation which will invariably effect a shearing cut, without drag or pull, of the material subjected to its action, and yet will not become clogged in the manner described above.

Another object of the present invention is to provide apparatus for cutting vegetation which, in invariably effecting a shearing cut, without drag or pull, of the material subjected to its action, and without becoming clogged in the manner described above, can be operated with no uneconomical consumption of power.

Yet another object of the present invention is to provide apparatus for cutting vegetation, of the character described, whose very operation will maintain its blades in a state of sharpness.

The manner of the attainment of these, and other, objects of the present invention and the advantages attendant upon its operation and use will become apparent when consideration is given to the following description, together with the accompanying drawings, which form a part of the specification, of the device embodying the present invention.

In the drawings:

Fig. 1 is a plan view of the device showing, by solid lines and by dotted lines, respectively, the movable parts thereof in two positions.

Fig. 2 is a lateral elevation of the device, viewed from the right side thereof.

Figure 6:
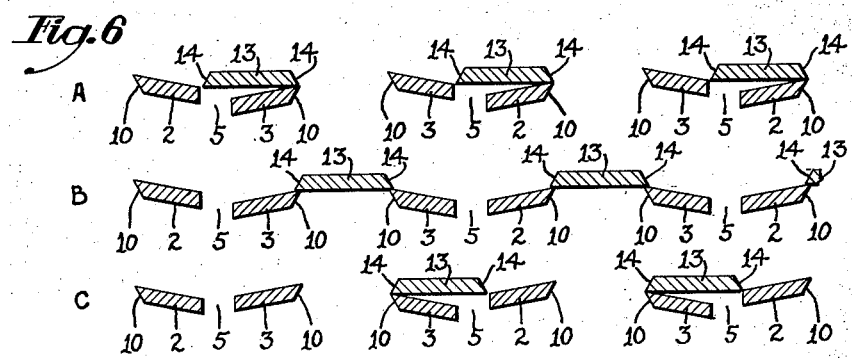

Fig. 6, A, B, C, are three front elevations, in section along the line 6, 6 of Fig. 1, showing the relations and the positions of the upper teeth and the lower teeth in the device, at three stages of a reciprocation of the upper teeth with respect to the lower teeth.

Figure 3:
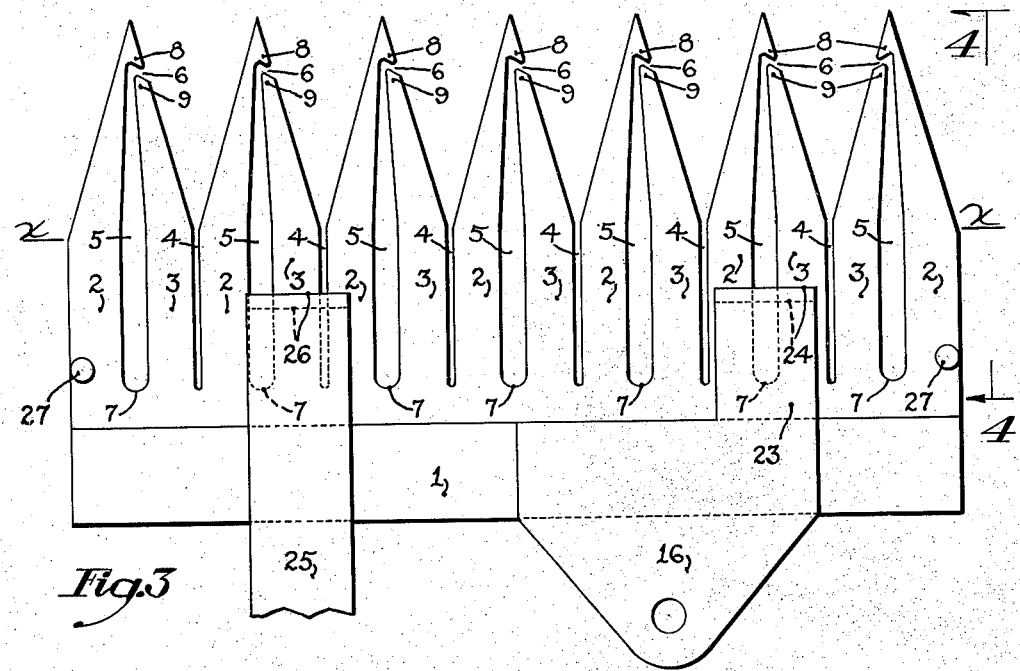
Fig. 3 is a plan view of the device, with the movable upper blades, the upper cutter bar, and the means for reciprocating the upper blades with respect to the lower blades, all detached from the lower blades.

As shown in Fig. 3, to which attention is now directed, 1 is the lower cutter bar to which are secured the pairs of the blades 2 and 3, unequal in length, forming the lower teeth of the device. In this embodiment of the present invention, all of the lower teeth are formed out of a sheet of resilient steel by cutting in the sheet of resilient steel the slits 4, which separate the teeth, and by fashioning their front portions into triangular shapes: each of these lower teeth is then bifurcated by the slits 5 and 6, and thus the separate lower blades 2 and 3 are formed. The bifurcating slits 5, narrowest near the tips of the lower teeth, gradually widen to constant widths at points substantially halfway of their lengths, and are then continued equal distances to terminate at the semicircular boundaries 7. The slits 6, one in each of the lower teeth, complete the bifurcations of the lower teeth into the lower blades 2 and 3: each of these slits 6 is, in direction, oblique to the respective slit 5 of which it forms a continuation, so that each slit 6 forms with its companion slit 5 an acute angle. Each pair of the lower blades thus produced consists of a long lower blade 2, whose tip is provided with a barb 8, the point of which is rounded, and a short lower blade 3, whose tip 9 is positioned within the barb 8 of its companion blade 2. Attention is here directed to the constructions of the two outermost lower blades of the device, for not one, but both, of these blades are of the type of long lower blade 2 for a reason which will presently appear.

Figures 4, 5:
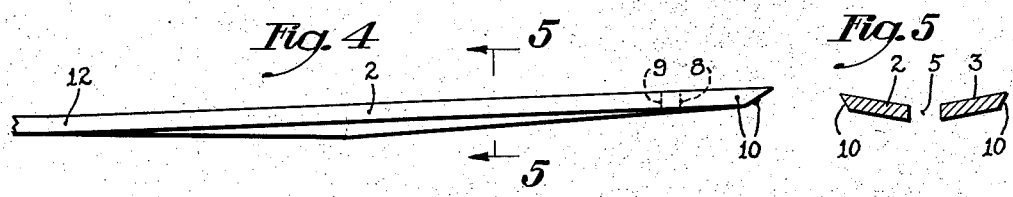
Fig. 4 is a lateral elevation of a pair of the blades forming one of the lower teeth of the device.
Fig. 5 is a front elevation, in section along the line 5, 5 of Fig. 4, of a pair of the blades forming one of the lower teeth of the device.

As shown in Figs. 3 and 4, the front portions of the lower teeth upon which the edges of the lower blades 2 and 3 are formed, are bent, but to only a very slight extent, upwardly out of the plane of their rear portions, along a line traversing the rear ends of the cutting edges of the lower blades 2 and 3, indicated by X, X in Fig. 3. The lower blades 2 and 3 are twisted lightly toward each other in order to elevate their outer edges above their central portions, as is shown in Fig. 5, and then each of the lower blades 2 and 3 is provided with a cutting edge by grinding the bevel 10 on its under outside edge.

As shown in Figs. 1 and 2, 11 is the upper cutter bar to which is secured the sheet of non-resilient steel 12 out of which, in this embodiment of the present invention, are fashioned the inflexible upper teeth 13, triangular in shape. The inflexible upper teeth 13 are provided with cutting edges by grinding the bevels 14 on their upper outside edges, and thus are formed pairs of the upper blades. The cutting edges of these upper blades are united into a continuous cutting edge by the curved bevels 15, the rearmost points of whose cutting edges lie forward of the slits 4, separating the lower teeth, and of the rear ends of the cutting edges of the lower blades 2 and 3. These inflexible teeth 13 are, in their lengths, sufficient to extend to the forward ends of the cutting edges of the short lower blades 3 but insufficient to extend to the rearmost points of the rounded barbs 8 of the long lower blades. The sheet of non-resilient steel 12 is, in its width, more than sufficient to maintain covered all of the slits 4 at all times during the operation of the device.

Secured to the lower cutter bar 1 is the plate 16, provided with a pivot, here shown as a bolt 17, provided with the washer 18 and the nut 19, on which is oscillatably mounted the movable lever 20, provided at its upper end with the fork 21, by which is engaged the headed pivot 22, with which the upper cutter bar 11 is provided. The plate 16 has an extension 23, with a downwardly directed abutment 24 at its upper end, forming a bracket which embraces the upper cutter bar 11 and maintains the movable sheet of non-resilient steel 12 and the inflexible upper teeth 13 in intimate contact with the lower teeth. A bar 25, in shape and in dimensions similar to the lever 20, is secured to the cutter bar 1, and its upper portion, with a downwardly directed abutment 26 at its end, forms a bracket which embraces the upper cutter bar 11 and maintains the movable sheet of non-resilient steel 12 and the inflexible upper teeth 13 in intimate contact with the lower teeth. The two pins 27, secured to the outermost lower blades 2, serve as stop means to limit the reciprocating movements of the movable inflexible upper teeth 13 with respect to the lower teeth.

The method of operating the illustrated device embodying the present invention is, of course, quite simple: the device is held in the hands of the operator by the lever 20 and the bar 25, the teeth of the device are presented to the material to be cut, and the movable upper blades are then reciprocated with respect to the lower blades by oscillating the lever 20; but the movements of the inflexible upper teeth, and, more particularly, the movements of the lower blades, during such reciprocations, merit detailed consideration.

When the inflexible upper teeth are in the positions indicated by the solid lines in Fig. 1, the inflexible upper teeth are held so firmly in intimate contact with the five inner long lower blades and the short lower blade on the right end of the device that they press these lower blades out of their natural positions, inclined upwardly from the plane of the rear portions of the lower teeth, or, in other words, the inflexible upper teeth temporarily restore these lower blades to the plane out of which they were bent. When the inflexible upper teeth are in the positions indicated by the dotted lines in Fig. 1, all of the short lower blades, save the short lower blade on the right end of the device, are similarly pressed out of their natural positions, inclined upwardly from the plane of the rear portions of the lower teeth, into positions substantially in the plane of the rear portions of the lower teeth, or, in other words, the inflexible upper teeth temporarily restore these lower blades to the plane out of which they were bent. For further elucidation of these statements, attention is now directed to Fig. 6, wherein are shown sections of the three lower teeth on the right end of the device and sections of the three inflexible upper teeth associated with these three lower teeth. In A, the short lower blade on the right end of the device and the proximate two inner long lower blades are pressed downwardly out of their natural positions by the inflexible upper teeth when the inflexible upper teeth are in the positions indicated by the solid lines in Fig. 1. In C, two of the inner short lower blades, but neither the long lower blade or the short lower blade of the lower tooth on the right end of the device, are pressed downwardly out of their natural positions by the inflexible upper teeth when the inflexible upper teeth are in the positions indicated by the dotted lines in Fig. 1. In B, both the short lower blades and the long lower blades, save the long lower blade on the right end of the device, are pressed downwardly out of their natural positions, but to extents less than in the two other views, by the inflexible upper teeth when the inflexible upper teeth are in positions intermediate the positions indicated by the solid lines and by the dotted lines in Fig. 1.

As the inflexible upper teeth are moved gradually, by the lever 20, to the left and out of the positions indicated by the solid lines in Fig. 1, the pressures exerted by the inflexible upper teeth upon the left blades of the lower teeth are relieved, and these left lower blades regain as gradually their natural positions, due to the resiliency of such blades. Simultaneously, the cutting edges of the left blades of the inflexible upper teeth make shearing sliding point-contact with the cutting edges of the right blades of the lower teeth, pressing as gradually the right blades of the lower teeth downwardly out of their natural positions, inclined upwardly from the plane of the rear portions of the lower teeth, into positions substantially in the plane of the rear portions of the lower teeth, which positions are attained when the inflexible upper teeth are in the positions indicated by the dotted lines in Fig. 1. Reversal of the direction of movement of the inflexible upper teeth shifts the inflexible upper teeth out of the positions indicated by the dotted lines in Fig. 1, relieving the pressures exerted by the inflexible upper teeth upon the right blades of the lower teeth, and these right lower blades regain their natural positions, due to the resiliency of such blades. Simultaneously, the cutting edges of the right blades of the inflexible upper teeth make shearing sliding point-contact with the cutting edges of the left blades of the lower teeth, pressing the left blades of the lower teeth downwardly out of their natural positions, inclined upwardly from the plane of the rear portions of the lower teeth, into positions substantially in the plane of the rear portions of the lower teeth, which positions are attained when the inflexible upper teeth are restored to the positions indicated by the solid lines in Fig. 1. Thus every complete reciprocation of the inflexible upper teeth with respect to the lower teeth causes a double oscillation of each of the lower blades in planes perpendicular to the plane of the inflexible upper teeth, and the oscillations of companion long and short lower blades are opposite in phase.

In the operation of the illustrated device embodying the present invention, the characters of the contacts made by the inflexible upper teeth and the lower resilient blades merit especial consideration in an extended discussion. When the inflexible upper teeth are in the positions indicated by the solid lines in Fig. 1, the inflexible upper teeth make line-contacts with the left lower blades along the juxtaposed under sides of the cutting edges of the left upper blades and the left lower blades. The undersurfaces of the inflexible upper teeth do not make contact with the adjacent undersurfaces of the lower resilient blades, since the lower resilient blades have been warped rotationally out of planes parallel to the undersurfaces of the inflexible upper teeth, and hence small but perceptible spaces intervene between the adjacent undersurfaces of the inflexible upper teeth and the lower resilient blades. When the inflexible upper teeth are in the positions indicated by the dotted lines in Fig. 1, the inflexible upper teeth make line-contacts with the right lower blades along the juxtaposed under sides of the cutting edges of the right upper blades and the right lower blades. The undersurfaces of the inflexible upper teeth do not make contact with the adjacent undersurfaces of the lower resilient blades, since the lower resilient blades have been warped rotationally out of planes parallel to the undersurfaces of the inflexible upper teeth, and hence small but perceptible spaces intervene between the adjacent undersurfaces of the inflexible upper teeth and the resilient lower blades.

As the inflexible upper teeth are moved gradually, by the lever 20, to the left and out of the positions indicated by the solid lines in Fig. 1, the line-contacts between the juxtaposed under sides of the cutting edges of the left upper blades and the left lower blades are instantaneously transformed into downwardly travelling sliding point-contacts between the cutting edges of the right blades of the inflexible upper teeth and the left blades of the lower teeth, while upwardly travelling shearing sliding point-contacts are simultaneously formed between the cutting edges of the left blades of the inflexible upper teeth and the right blades of the lower teeth. These point-contacts persist until the inflexible upper teeth attain the positions indicated by the dotted lines in Fig. 1, when the downwardly travelling sliding point-contacts between the cutting edges of the right blades of the inflexible upper teeth and the left blades of the lower teeth are broken, and the upwardly travelling shearing sliding point-contacts between the cutting edges of the left blades of the inflexible upper teeth and the right blades of the lower teeth are transformed into line-contacts between the juxtaposed under sides of the cutting edges of the right upper blades and the right lower blades. Reversal of the direction of movement of the inflexible upper teeth shifts the inflexible upper teeth out of the positions indicated by the dotted lines in Fig. 1, instantaneously transforming the line-contacts between the juxtaposed under sides of the cutting edges of the right upper blades and the right lower blades into downwardly travelling sliding point-contacts between the cutting edges of the left blades of the inflexible upper teeth and the right blades of the lower teeth, and forming uwardly travelling shearing sliding point-contacts between the cutting edges of the right blades of the inflexible upper teeth and the left blades of the lower teeth. These point-contacts persist until the inflexible upper teeth are restored to the positions indicated by the solid lines in Fig. 1, when the downwardly travelling sliding point-contacts between the cutting edges of the left blades of the inflexible upper teeth and the right blades of the lower teeth are broken, and the upwardly travelling shearing sliding point-contacts between the cutting edges of the right blades of the inflexible upper teeth and the left blades of the lower teeth are transformed into line-contacts between the juxtaposed under sides of the cutting edges of the left upper blades and the left lower blades.

This detailed exposition of the characters of the contacts made by the inflexible upper teeth and the lower resilient blades during the operation of the illustrated device embodying the present invention shows very clearly that at no stage in the operation of the device are there moving surfaces in intimate contact, between which grass may become engaged, clogging the device and thus diminishing the efficiency with which it may be operated. Rather does the cooperative action of the inflexible upper teeth and the resilient lower blades, producing the oscillations, opposite in phase, of the pairs of resilient lower blades, serve to discharge any transient accumulations of grass upon, or between, the inflexible upper teeth and the resilient lower blades: this self-discharging action of the resilient lower blades is enhanced by the character of the bifurcating slits 5, which, widening progressively from the tips of the lower teeth to points halfway of their lengths, allow any accumulations of grass between the pairs of resilient lower blades to be swept out by the stubble with which the outside surfaces of the lower teeth come in contact during the use of the device. And since the slits 6 are directed backwardly from the tips of the lower teeth, none of the material being cut can enter the bifurcating slits 5 at their narrowest widths. Similar widening, in a progressive manner, of the slits 4, separating the lower teeth of the device, is promotive of the discharge of minute accumulations of grass which may become lodged between the sheet of non-resilient steel and the rear portions of the resilient lower blades, but the need for such progressive widening of the slits 4 is less great than is the need for the progressive widening of the bifurcating slits 5, inasmuch as the slits 4 are maintained ever covered by the sheet of non-resilient steel, and hence such progressive widening of the slits 4 is not shown in the drawings.

The indispensable shearing sliding point-contacts and sliding point-contacts characterizing the operation of the illustrated device embodying the present invention can be realized in cutting apparatus by the use of resilient lower blades, even when the angles between the cutting edges of the blades of the inflexible upper teeth and the cutting edges of the resilient lower blades are vanishingly small in magnitudes. Likewise the indispensable avoidance of moving surfaces in intimate contact characterizing the operation of the illustrated device embodying the present invention can be realized in cutting apparatus by the use of rotationally warped lower blades, even when the rotational warping of such blades is extremely slight. Since the areas of contact between the cutting edges of the blades of the inflexible upper teeth and the cutting edges of the resilient lower blades are, at all times, minute, the operation of cutting apparatus embodying the present invention will be economical in the consumption of power. And since the common method of sharpening a cutting edge consists in subjecting it to shearing sliding point-contacts and sliding point-contacts with sharpening means, the operation of the illustrated device embodying the present invention will serve to maintain the cutting edges of both sets of its blades in a state of sharpness.

The two outermost resilient lower blades are not, of course, provided with cutting edges, and are preferably of the type of resilient long lower blade 2, so that the slits 6 separating them from their companion resilient short lower blades are directed inwardly. Such construction has no exposed barb to catch on materials with which the device may come into contact when not in actual use. The rounding of the points of the barbs serves the same purpose.

While the resilient lower blades of the illustrated device embodying the present invention are formed out of a sheet of resilient steel, they may be, if desired, entirely separate members, attachable to, and detachable from, the cutter bar 1. Such construction possesses the advantage of permitting replacements of broken resilient lower blades.

While the construction and operation of the illustrated device embodying the present invention has been described in great detail, the present invention is not to be deemed limited to the precise construction disclosed. Thus, for example, the reciprocation of the inflexible upper teeth with respect to the resilient lower blades is herein effected by means of the lever 20; whereas, in constructions of mowing machines embodying the present invention, such reciprocation may be effected by any other suitable mechanical means, such as a shaft actuated by an eccentric or cam; yet such means of reciprocating the inflexible upper teeth with respect to the resilient lower blades is comprised by the present invention whose scope is to be measured solely by the appended claims.

Having described my invention, I claim:

1. Apparatus for cutting vegetation comprising, in combination, a cutter bar provided with resilient bifurcated double-edged teeth inclined to the plane of the cutter bar, a second cutter bar provided with inflexible teeth, means for maintaining the cutter bars in cooperative relation, and means for reciprocating one cutter bar with respect to the other cutter bar.

2. Apparatus for cutting vegetation comprising, in combination, a cutter bar provided with bifurcated double-edged teeth rotationally warped, a second cutter bar provided with inflexible teeth, means for maintaining the cutter bars in cooperative relation, and means for reciprocating one cutter bar with respect to the other cutter bar.

3. Apparatus for cutting vegetation comprising, in combination, a cutter bar provided with resilient bifurcated double-edged teeth inclined to the plane of the cutter bar with their cutting edges displaced to extents greater than are their central portions, a second cutter bar provided with inflexible teeth, means for maintaining the cutter bars in cooperative relation, and means for reciprocating one cutter bar with respect to the other cutter bar.

4. Apparatus for cutting vegetation comprising, in combination, a cutter bar provided with double-edged teeth bifurcated by slits along their axes extending to within short distances from their tips where the said slits are continued into slits at acute angles to the said slits, a second cutter bar provided with inflexible teeth extending to within short distances from the conjunctions of the slits in the double-edged bifurcated teeth when the cutter bars are in cooperative relation, means for maintaining the cutter bars in cooperative relation, and means for reciprocating one cutter bar with respect to the other cutter bar.

5. In a device for cutting vegetation, teeth comprising single-edged blades in pairs, separated at their rear edges by short distances and unequal in length, the longer blade of each tooth having a tip provided with a barb and the shorter blade having its tip positioned within the barb of the longer blade.

6. In a device for cutting vegetation, teeth comprising resilient single-edged blades in pairs, separated at their rear edges by short distances, inclined to the planes of the rear portions of the teeth, and unequal in length, the longer blade of each tooth having a tip provided with a barb and the shorter blade having its tip positioned within the barb of the longer blade.

7. In a device for cutting vegetation, teeth comprising single-edged blades in pairs, separated at their rear edges by short distances, rotationally warped to displace their cutting edges out of the planes of the rear portions of the teeth, and unequal in length, the longer blade of each tooth having a tip provided with a barb and the shorter blade having its tip positioned within the barb of the longer blade.

8. In a device for cutting vegetation, teeth comprising resilient single-edged blades in pairs, separated at their rear edges by short distances, inclined to the planes of the rear portions of the teeth and rotationally warped to displace their cutting edges out of the planes of the rear portions of the teeth to extents greater than are their rear edges, and unequal in length, the longer blade of each tooth having a tip provided with a barb and the shorter blade having its tip positioned within the barb of the longer blade.

9. In a device for cutting vegetation, teeth comprising resilient single-edged blades in pairs, with their cutting edges extending in opposite directions, and separated at their rear edges by distances progressively increasing from the forward ends of the teeth to lines transverse the rear ends of their cutting edges.

10. In a device for cutting vegetation, teeth comprising resilient single-edged blades in pairs, with their cutting edges extending in opposite directions, and with their rear edges spaced apart less greatly at the forward ends of the teeth than at their rear ends.

JOHN W. MURPHY.